United States Patent
Chen et al.

(10) Patent No.: US 11,645,846 B2
(45) Date of Patent: May 9, 2023

(54) CLOSED-LOOP DETECTING METHOD USING INVERTED INDEX-BASED KEY FRAME SELECTION STRATEGY, STORAGE MEDIUM AND DEVICE

(71) Applicant: Anhui Polytechnic University, Wuhu (CN)

(72) Inventors: Mengyuan Chen, Wuhu (CN); Lingmei Ding, Wuhu (CN)

(73) Assignee: Anhui Polytechnic University, Wuhu (CN)

( * ) Notice: Subject to any disclaimer, the term of this patent is extended or adjusted under 35 U.S.C. 154(b) by 0 days.

(21) Appl. No.: 17/836,147

(22) Filed: Jun. 9, 2022

(65) Prior Publication Data
US 2022/0406059 A1  Dec. 22, 2022

(30) Foreign Application Priority Data

Jun. 9, 2021  (CN) .......................... 202110643771.2

(51) Int. Cl.
  G06V 20/00   (2022.01)
  G06V 20/40   (2022.01)
  G06T 7/70    (2017.01)
  G05D 1/02    (2020.01)

(52) U.S. Cl.
  CPC ........... G06V 20/46 (2022.01); G05D 1/0219 (2013.01); G05D 1/0246 (2013.01); G06T 7/70 (2017.01); G05D 2201/0207 (2013.01)

(58) Field of Classification Search
  CPC .... G06V 20/46; G05D 1/0219; G05D 1/0246; G05D 2201/0207; G06T 7/70
  See application file for complete search history.

(56) References Cited

U.S. PATENT DOCUMENTS

| | | | | |
|---|---|---|---|---|
| 11,210,805 | B2 * | 12/2021 | Bao ........................ | G06T 7/593 |
| 2018/0039276 | A1 * | 2/2018 | Keivan ................. | G01C 21/20 |
| 2021/0129345 | A1 * | 5/2021 | Liu ........................ | G16H 40/67 |

FOREIGN PATENT DOCUMENTS

| | | | | |
|---|---|---|---|---|
| CN | 106909877 | * | 6/2017 | .......... G06V 10/255 |
| CN | 108682027 | * | 10/2018 | ............... G06T 7/38 |
| CN | 108986168 | * | 12/2018 | .......... G06V 10/464 |
| CN | 111813113 | * | 10/2020 | .......... G05D 1/0223 |
| CN | 112595322 | * | 9/2021 | ............ G01C 21/20 |
| WO | WO-2020078064 | * | 4/2020 | .......... G01C 21/005 |

* cited by examiner

*Primary Examiner* — Amara Abdi
(74) *Attorney, Agent, or Firm* — Onello & Mello, LLP

(57) ABSTRACT

A closed-loop detecting method using an inverted index-based key frame selection strategy, storage media and apparatus are provided. The method includes following steps: step I: acquiring image information at a current position, processing the image information to extract corresponding image features therefrom and solve a camera pose; step II: capturing image features successively during movement of a robot, as consecutive image frames, performing, on the consecutive image frames, an indexing, in which the inverted index-based key frame selection strategy is introduced into a key frame selection strategy to supplement key frames which are prone to be missed in a conventional forward indexing during a curvilinear movement of the robot; and step III: performing closed-loop detection and correction of accumulative errors based on image features carried by key frames.

15 Claims, 9 Drawing Sheets

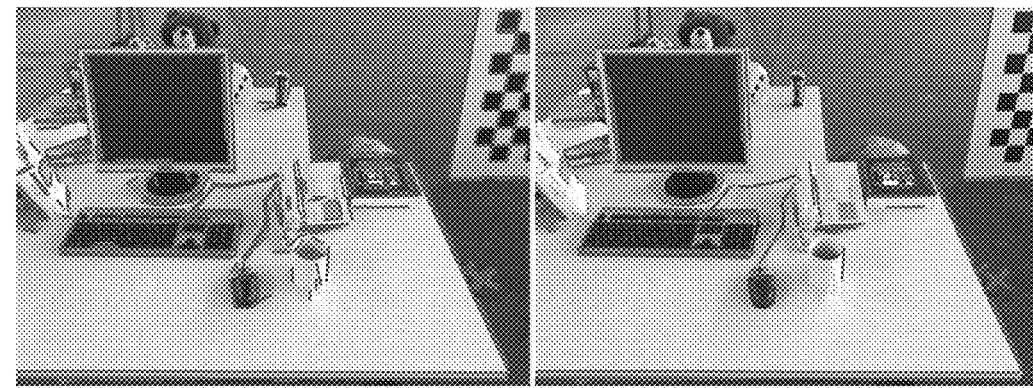
(a) The effect of LSD line feature extraction
(b) The effect of line feature extraction with conditional screening
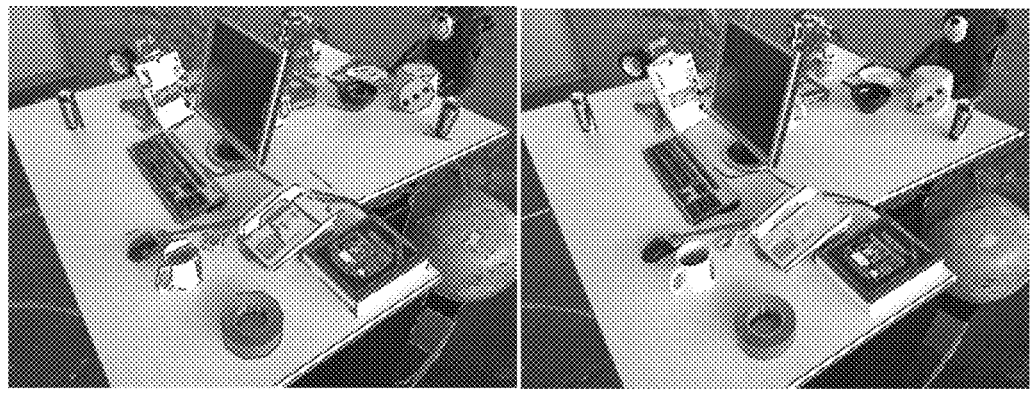
(c) The effect of LSD line feature extraction
(d) The effect of line feature extraction with conditional screening
FIG. 3
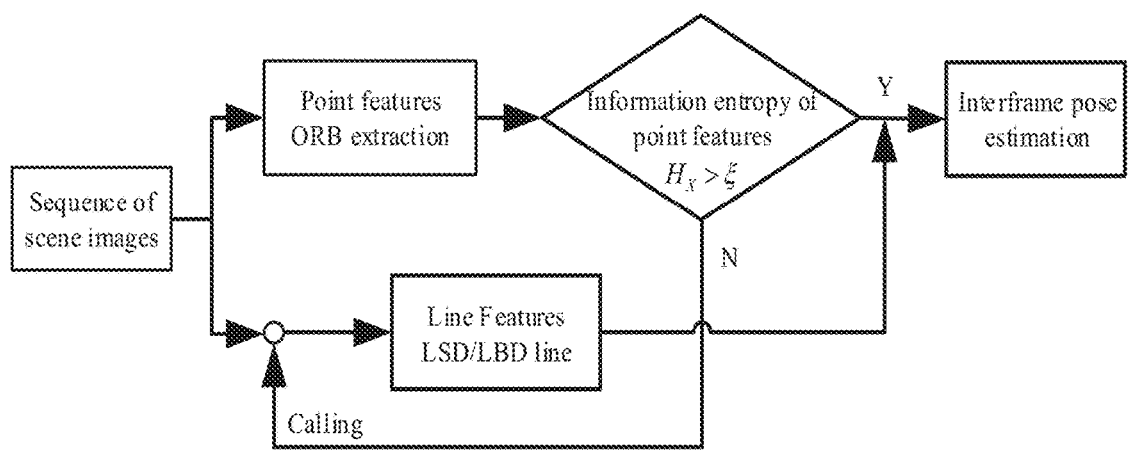
FIG. 4

(a) Point feature epipolar geometry constraint  (b) Triangulation algorithm for line features

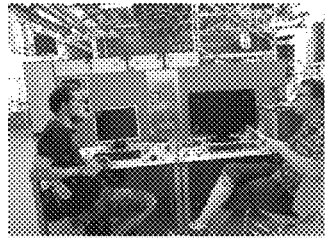
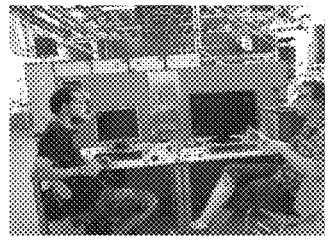
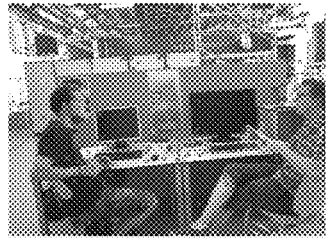

(a) Feature extraction by ORB-SLAM2 algorithm in dense scene (b) Feature extraction by PL-SLAM algorithm in dense scene (c) Feature extraction by IFPL-SLAM algorithm in dense scene

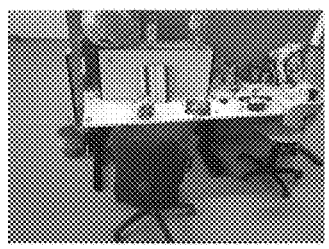
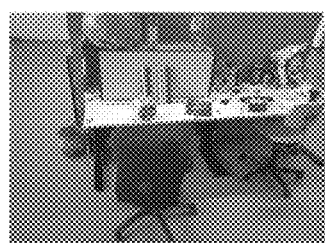
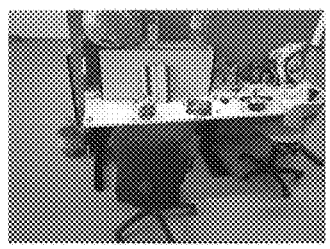

(d) Feature extraction by ORB-SLAM2 algorithm in dense scene (e) Feature extraction by PL-SLAM algorithm in dense scene (f) Feature extraction by IFPL-SLAM algorithm in dense scene

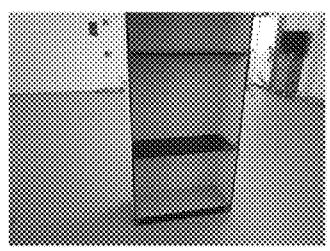
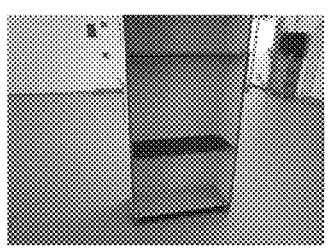
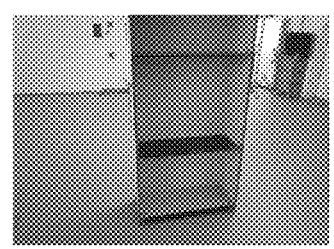

(g) Feature extraction by ORB-SLAM2 algorithm in sparse scene (h) Feature extraction by PL-SLAM algorithm in sparse scene (i) Feature extraction by IFPL-SLAM algorithm in sparse scene

FIG. 7

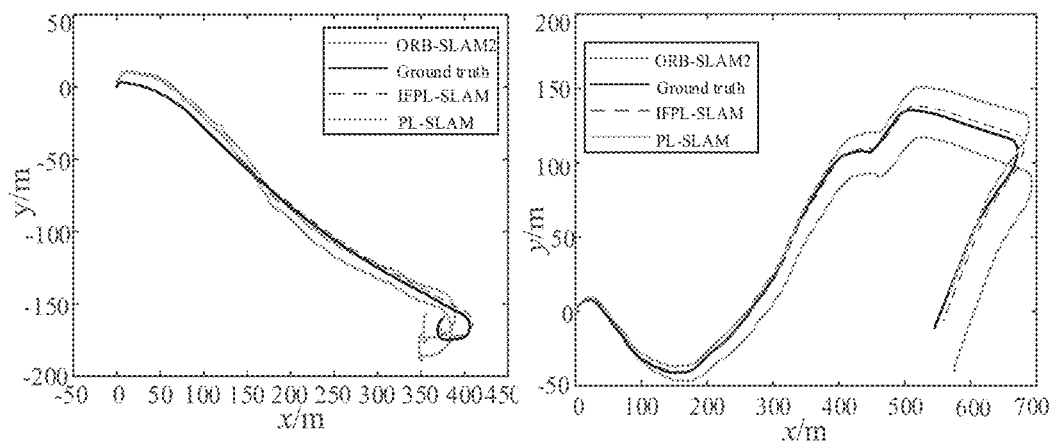
(a) Comparison of trajectory in the sequence 01
(b) Comparison of trajectory in the sequence 10
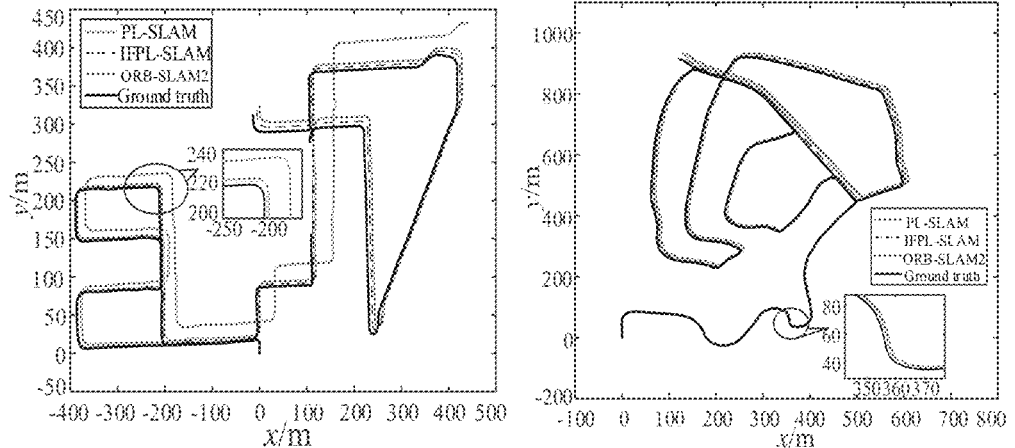
(c) Comparison of trajectory in the sequence 08
(d) Comparison of trajectory in the sequence 02
FIG. 8

CLOSED-LOOP DETECTING METHOD USING INVERTED INDEX-BASED KEY FRAME SELECTION STRATEGY, STORAGE MEDIUM AND DEVICE

CROSS REFERENCE TO RELATED APPLICATION(S)

This application claims priority to Chinese Patent Application No. 202110643771.2, filed with the Chinese Patent Office on Jun. 9, 2021, and entitled "CLOSED-LOOP DETECTING METHOD USING INVERTED INDEX-BASED KEY FRAME SELECTION STRATEGY, STORAGE MEDIUM AND DEVICE". The aforementioned application is incorporated herein by reference in its entirety.

TECHNICAL FIELD

The present disclosure relates to a closed-loop detecting method using inverted index-based key frame selection strategy, storage medium and device.

BACKGROUND ART

Since Simultaneous Localization and Mapping (SLAM) algorithm is an effective method for localizing and mapping in prior art. Key frame selection plays an important role in the localization accuracy and mapping efficiency of the SLAM algorithm, and especially back-end optimization and closed-loop detection are performed based on the selected key frames. However, in the existing SLAM algorithm, the traditional key frame selection method is prone to the problem of missing key frames near inflection points of a curve motion trajectory, which makes the overall algorithm suffer from large accumulative errors in the process of mapping and closed-loop detecting, difficulties in accurate positioning and incomplete ability to correct the closed-loop errors. In addition, in order to ensure that enough image features are used to obtain the camera pose of the robot and the results are reliable, the current SLAM algorithms usually extract point features and line features both and combine them to calculate the poses. This method may cause redundant features and unnecessary computation in densely textured scenes, due to the fact that both point and line features are used for pose estimation. When line features need to be extracted and matched, the LSD algorithm is often used in the prior art. LSD, as an excellent local linear feature extraction algorithm, has the advantage of yielding line feature detection results with accuracy of sub-pixel level in linear time, and however, has some obvious disadvantages, such as further increased calculation time.

SUMMARY

The purpose of the present disclosure is to provide a closed-loop detecting method using inverted index-based key frame selection strategy, to solve the technical problems that the existing SLAM algorithm has a tendency to miss key frames near inflection points of a curve motion trajectory during mapping and closed-loop detecting and has a large computational effort.

The closed-loop detecting method using inverted index-based key frame selection strategy includes the following steps.

Step I: acquiring image information at a current position for being processed, extracting corresponding image features from the processed image information and solving a camera pose.

Step II: capturing image frames successively during movement of a robot, as consecutive image frames, performing, on the consecutive image frames, an indexing, in which the inverted index-based key frame selection strategy is introduced into a key frame selection strategy to supplement key frames which are prone to be missed in a conventional forward indexing during a curvilinear movement of the robot.

Step III: performing closed-loop detection and correction of accumulative errors based on image features carried by key frames.

Preferably, the key frame selection strategy includes: performing the indexing in indexing modes composed of a forward indexing with an indexing order identical with image acquisition order, and an inverted indexing, with an indexing order opposite to the image acquisition order, where in the forward indexing, the indexing is performed forwardly with a latest key frame as a starting point until a next key frame is searched or a last frame in the consecutive image frames is indexed; when a new key frame is determined based on an angle threshold of forward indexing, the inverted indexing start to be performed, and in the inverted indexing, the indexing is performed invertedly with the new key frame being a current key frame as a starting point until a previous key frame is searched; and in the forward indexing, a current consecutive image frame is selected as a key frame based on whether a displacement variation or a forward rotation variation between the current consecutive image frame and the current key frame reaches the corresponding threshold; and in the inverted indexing, an inverted rotation variation between the current key frame and each of normal frames located between the current key frame and the previous key frame is estimated, and when the inverted rotation variation is greater than the inverted angle threshold, corresponding normal frame is determined to be a missing key frame and added to a key frame library.

Preferably, a mathematical expression of the key frame selection strategy is:

$$kf_j = \{f_i | ([\Delta p_{ji} > \tau] \cup [\Delta \theta_{ji} > \gamma_1] \cup [\Delta \theta_{ci} > \gamma_2])\},$$

where $kf_j$ denotes a key frame, when the key frame selection strategy is satisfied, a new key frame is inserted and j is incremented, $j=j+1$, and when the inserted new key frame $kf_j$ satisfies $\Delta\theta_{ji} > \gamma_1$, the new key frame $kf_j$ is set as a starting point of the inverted indexing, which also is a current key frame $kf_c$, c being a marker of a current frame, during supplementing key frame in the inverted indexing, the new key frame is set as a new starting point for subsequent inverted indexing without resetting the current key frame $kf_c$, $f_i$ denotes a i-th consecutive image frame; in forward indexing, $\Delta p_{ji}$ denotes a displacement variation from a current i-th consecutive image frame $f_i$ to a previous key frame $kf_j$ which is a j-th key frame, and $\Delta\theta_{ji}$ denotes a forward rotation variation from the current i-th consecutive image frame $f_i$ to the previous key frame $kf_j$; during inverted indexing the strategy, a rotation variation $\Delta\theta_{ci}$ between $kf_c$ and the normal frame $f_{i_c-r}$, ($i_{c-1} < i_c - r < i_c$) located between $kf_c$ and $kf_{c-1}$ is calculated, and then $i = i_c - r$; $\Delta\theta_{ci}$ denotes the inverted rotation variation between the current key frame $kf_c$ and the i-th consecutive image frame located between the current key frame $kf_c$ and the previous key frame $kf_{c-1}$ during the inverted indexing, $\tau$ denotes a displacement threshold, $\gamma_1$ denotes a forward angle threshold, $\tau$ and $\gamma_1$ are main basis for selecting key frames in the forward indexing, $\gamma_2$ denotes an inverted angle threshold, which is a basis for selecting key frames in the inverted indexing.

Preferably, a pose tracking decision under guidance of information entropy is provided, and includes: firstly extracting point features in the image, calculating an amount of information contained in the point features by information entropy $H_X$, and calling line features in the image to assist in pose estimation when the information entropy $H_X$ is below a set threshold, otherwise, performing the pose estimation by point features only.

Preferably, calling line features to assist in pose estimation includes:

step 1: acquiring the image information at the current position during environment exploration of the robot in an experimental scene, calculating an image pixel gradient, obtaining a line support region in a formed pixel gradient field by using a region growth algorithm, and performing rectangular estimation on the line support region to obtain alternative line features;

step 2: updating the rectangular line support region based on a number of false alarms, outputting LSD line features meeting criteria, so as to get an initial line feature set $L_n^i$.

step 3: storing line features in the initial line feature set $L_n^i$ in descending order of length value, and performing screening and merging on them according to certain requirements to obtain a new line feature set $H_n^i$.

step 4: performing effective linear matching by using appearance and geometric constraint of the linear features after eliminating redundant line features, so as to solve the camera pose.

Preferably, the step 3 includes:

step 3.1: calculating a number of line features with upper line segment lengths greater than a length threshold $\lambda$ in the current image frame, and storing these line features into a set $N_\lambda$;

step 3.2: reserving first $\delta$ line features in set $H_n^i$, when a number of line features in set $N_\lambda$ is greater than $\delta$, $\delta$ being a threshold value adapted to overall sparsity of scene texture, and removing other redundant line features in set $H_n^i$ to obtain a new set $N_\lambda$.

step 3.3: splicing over-segmented long line features by splicing broken line features when the number of line features in set $N_\lambda$ is less than $\delta$, and updating $H_n^i$ and $N_\lambda$ simultaneously; stopping step 3.3 and returning to step 3.2 when the number of line features in set $N_\lambda$ is greater than or equal to $\delta$; and otherwise, reserving and outputting all line features in the initial line feature set $L_n^i$, in case that scene texture in the current image frame is sparse.

Preferably, step III includes: searching, after selecting a new key frame, all other key frames with same vocabulary as that of the selected key frame in the map by using a bag-of-words vector in a bag-of-words model, and determining whether a moving trajectory forms a closed loop by calculating a similarity score between features of the selected key frames and the new key frame.

The present disclosure also provides a computer readable storage medium having a computer program stored thereon, the computer program when executed by a processor implements the steps of a closed-loop detecting method using inverted index-based key frame selection strategy as described above.

The present disclosure also provides a computer device comprising a memory, a processor and a computer program stored in the memory and executable on the processor, said computer program when executed by the processor implements the steps of a closed-loop detecting method using inverted index-based key frame selection strategy as described above can be implemented.

The present disclosure has the following advantages.

(1) To address the problem of feature computation redundancy due to the fact that Simultaneous Localization and Mapping (PL-SLAM) algorithm uses both point and line features (for pose tracking) in dense scenes, an information entropy-based guided pose tracking strategy is proposed, The priority extracted feature points are evaluated by utilizing the information entropy. A fusion of point and line features is determined based on evaluation results. The method avoids the problem of data redundancy caused by the simultaneous use of point and line features in scenes with dense textures, and improves the real-time performance of the algorithm.

(2) To address the problem that long line features are over-segmented into short line features when LSD line features are extracted, resulting in more short line features and causing false matching interference for subsequent feature matching. Selection under conditions and a splicing method for broken line features are performed on the short line features extracted by the LSD algorithm to eliminate redundant short line features, thereby improving the accuracy of feature matching.

(3) To address the problem that key frames missed during curvilinear motion by utilizing the conventional key frame selection method, an inverted index-based key frame selection strategy is proposed in the present disclosure. In the strategy, the inverted index-based key frame selection strategy is enabled when a new key frame is determined based on the rotation variation, to calculate the inverted rotation variation between the current key frame and all normal frames between the current key frame and the previous key frame. When the inverted rotation variation exceeds the set threshold, the corresponding normal frames are added as key frames. In this way, the problem that the key frame missed during curvilinear motion can be solved by introducing the inverted index-based key frame selection strategy, and the closed-loop accuracy and positioning precision of the algorithm can be improved.

BRIEF DESCRIPTION OF THE DRAWINGS

FIG. 3 shows a comparison diagram of effects of line feature extraction according to the present disclosure.

FIG. 4 shows a framework diagram of an information entropy-based guided pose tracking decision according to the present disclosure.

FIG. 7 shows a comparison among feature extractions by utilizing three algorithms in scenes with different densities according to experiment I in the present disclosure.

FIG. 8 shows a diagram of trajectories under KITTI dataset sequences by utilizing the three algorithms in experiment II according to the present disclosure.

DETAILED DESCRIPTION OF THE EMBODIMENTS

Figure 1:
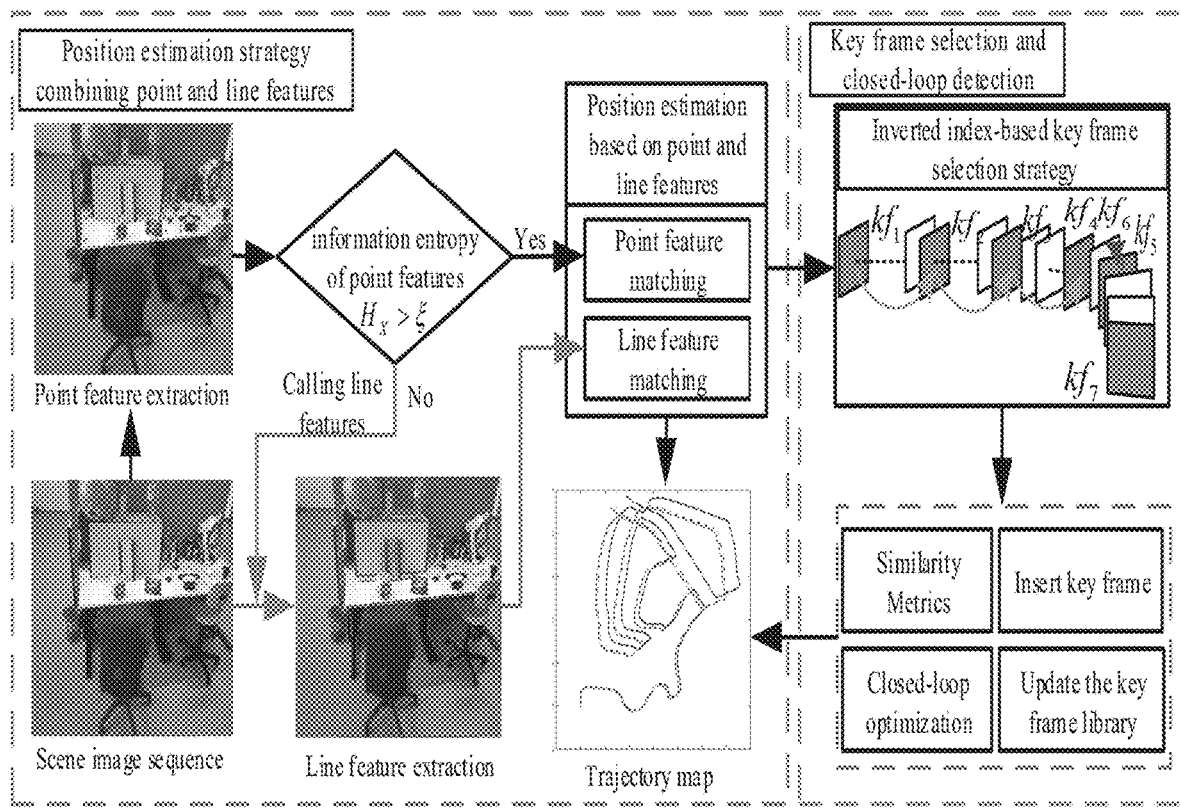
FIG. 1 shows a framework diagram of a closed-loop detecting method using inverted index-based key frame selection strategy according to the present disclosure.

In order to help those skilled in the art to have a more complete, accurate and in-depth understanding of the conception, technical solutions of the present disclosure, the following specific embodiments of the present disclosure are described in further detail against the accompanying drawings.

Considering that the existing PL-SLAM algorithm uses both point and line features for pose tracking in dense scenes and easily causes redundancy during feature computing, a new IFPL-SLAM algorithm, also called improved fast PL-SLAM algorithm, is proposed by further improving the PL-SLAM algorithm. A closed-loop detecting method using inverted index-based key frame selection strategy is implemented by using the IFPL-SLAM algorithm. Specific examples are described as follows.

Example I

As shown in FIGS. 1-11, a closed-loop detecting method using inverted index-based key frame selection strategy is provided, which includes the following steps.

In step I, information of an image at a current position is acquired, and processed to extract corresponding image feature for calculating a camera pose.

To avoid feature redundancy caused by extracting point and line features both for pose estimation in dense image texture scenes, a pose tracking decision under guidance of information entropy is proposed in the present disclosure. According to the tracking decision, after the robot acquires the visual scene image sequence, firstly point features in the image are extracted, and the information amount of the point features are calculated by utilizing information entropy. Then, line features in the image are called for auxiliary pose estimation when the information amount of the point features is insufficient; otherwise, the pose estimation is performed only by utilizing the point features. The framework diagram of the pose tracking decision under guidance of information entropy is shown in FIG. 4.

Information entropy is a quantitative measurement of random discrete information, and can directly represent the amount of information contained in an image. In view of uncertain distribution of feature points extracted from the image, the present disclosure calculates the amount of information contained in a preferentially extracted point feature i by utilizing the information entropy. The calculation rule is shown in following equation (1):

$$H_X = -\sum_{i=1}^{n} P(x_i, y_i) \log_2(P(x_i, y_i)). \quad (1)$$

Where $P(x_i, y_i)$ denotes a probability that an i-th feature point appears at a position $(x_i, y_i)$ in the image; n represents a number of feature points in the image; $H_X$ represents an information entropy of the feature points in the image. The larger a value of the information entropy is, the more information carried by the extracted feature points in the image is; otherwise, the smaller the value of the information entropy is, the less information carried by the extracted feature points in the image is.

When the information entropy $H_X$ of the point features is higher than the set threshold $\xi$ ($\xi$ is an empirical value and estimated from multiple experiments), it indicates that the point features on this image are enough for the algorithm to perform pose estimating and tracking, that is, the line features in the environment need not be called at this time. When the scene texture features in the image become sparse, the difficulty of extracting point features increases, the number of point features decreases or distribution is uneven, and further the information entropy $H_X$ is lower than the set threshold $\xi$ at this time. In order to ensure that there is enough environmental information to participate in the pose estimation, the line features in the image are called to assist in the pose estimation, to avoid the loss of pose tracking. In addition, compared with conventional point-line fusion visual odometry, through optionally involving the line features in the pose estimation, the method fundamentally avoids the redundant extraction and computation of image features, thereby alleviating the problems such as tight computational resources and lack of real-time due to a large amount of computation. The decision algorithm under guidance of information entropy for pose tracking is shown as follows.

---

Algorithm 1
Information entropy-based guided pose tracking decision algorithm

---

Input: Continuous image frame $f_i$
Output: Current robot's pose estimation
Parameters: Information entropy threshold of point features $\xi$
FOR new $f_i$ available THEN
    Point features of a image are extracted by utilizing ORB algorithm Calculating information entropy score of point features:

$$H_X = -\sum_{i=1}^{n} P(x_i, y_i) \log_2(P(x_i, y_i))$$

IF $H_X > \xi$ THEN
        Matching point features in the image to estimate the current pose of the robot
    ELSE
        Calling line features in the image, extracting line features by using LSD algorithm, and filtering and splicing broken line features by condition
        Feature matching based on a fusion of point and line features to estimate the current position of the robot
    END IF
END FOR

---

LSD algorithm in the prior art is usually adopted to extract and match line features. As an excellent local linear feature extraction algorithm, LSD algorithm has the advantage of obtaining line feature detection results with sub-pixel accuracy in linear time. However, LSD algorithm has obvious disadvantages, such as time-consuming computation. Therefore, in the present method, the line features extracted by the LSD algorithm is screened by condition, including splicing over-segmented line features and removing the redundant short line features, to reduce the computation time consuming in redundant matching, as well as improve the accuracy of line feature matching. Step I is the specific process of the improved line feature-assisted pose estimation method.

In step 1, the image information at the current position is acquired during environment exploration of a robot in the experimental scene, and calculates image pixel gradient, including a direction $L_\theta$ and an amplitude $G(x,y)$, as shown in equations (2)-(4).

$$\begin{cases} g_x(x, y) = \dfrac{i(x+1, y) + i(x+1, y+1) - i(x, y) - i(x, y+1)}{2} \\ g_y(x, y) = \dfrac{i(x, y+1) + i(x+1, y+1) - i(x, y) - i(x+1, y)}{2} \end{cases} \quad (2)$$

$$L_\theta = \arctan\left[-g_x(x, y)/g_y(x, y)\right] \quad (3)$$

$$G(x, y) = \sqrt{g_x(x, y)^2 + g_y(x, y)^2}. \quad (4)$$

Where $g_x(x,y)$, $g_y(x,y)$ represent gradients of pixel points in x-axis and y-axis directions, and $i(x,y)$ denotes a gray-scale value of a pixel point at position $(x,y)$ in the image. A line support region is obtained in the formed pixel gradient field by using a region growing algorithm, and subsequently a rectangular estimation is performed on this support region to obtain alternative line features.

In step 2, the rectangular line support region is updated based on a number of false alarms (NFA), and the LSD line features that meet criteria are output. The specific expression is expressed in equation (5).

$$\begin{cases} \text{Output line support region } R \text{ is the line feature, } NFA < \varepsilon, \\ \text{Update the line support region } R, NFA \geq \varepsilon. \end{cases} \quad (5)$$

Where threshold $\varepsilon$ represents an evaluation of a density of pixel points in a rectangle. The output line features are described by using LBD description operator. The extracted line features are stored in a set $L_n^i = (l_1^i, l_2^i, l_3^i, \ldots, l_n^i)$. The set $L_n^i$ indicates that there are a total of n line features in an i-th frame image, and $l_n^i$ denotes an n-th line feature in the i-th frame image, and the set $L_n^i$ is an initial set of line features.

In step 3, the line features in the set $L_n^i$ are sorted in descending order of length value, and are screened and merged according to certain requirements to obtain a new line feature set $H_n^i = \{h_1^i, h_2^i \ldots h_n^i\}$. Where a number of elements in the set $H_n^i$ and the line feature information carried by the elements themselves remain unchanged from $L_n^i$. This step includes the following sub-steps.

In step 3.1, a number $N_\lambda$ of line features with upper line segment lengths greater than a length threshold $\lambda$ in the current image frame $f_c$ is calculated and expressed as $N_\lambda = \{H | h_n^i > \lambda, i=c\}$.

In step 3.2, when a number of line features in the set $N_\lambda$ is greater than $\delta$, which is a threshold value adapted to the overall sparsity of the scene texture, first $\delta$ line features are reserved and other redundant line features in set $H_n^i$ are removed to update set $H_n^i$.

Figure 2:
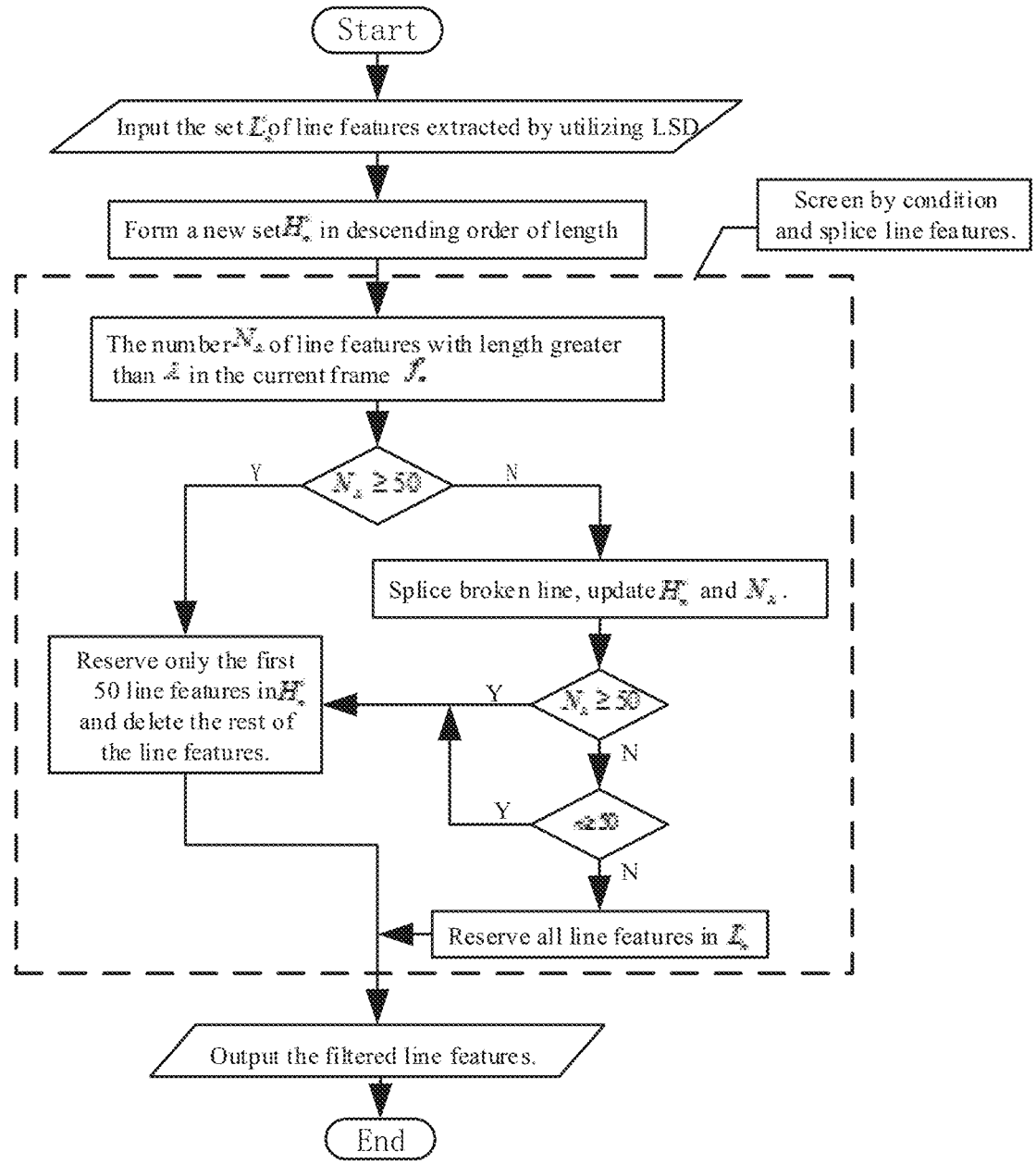
FIG. 2 shows a flow chart of screening line features by condition according to the present disclosure.

In step 3.3, if the number of line features in the set $N_\lambda$ is less than $\delta$, the over-segmented long line features are spliced by means of the a splicing method for broken line features and simultaneously $H_n^i$ and $N_\lambda$ are updated, When the number of line features in the set $N_\lambda$ is greater than or equal to $\delta$, the step is stopped and returned to step 3.2. Otherwise, it means that the scene texture in the current frame $f_c$ is sparse, that is, the camera may be in an area of sparse texture or a camera shake may occur and cause poor image quality. In this case, all line features in the initial line feature set $L_n^i$ are reserved and output. The flow chart of the above steps is shown in FIG. 2.

In step 4, after eliminating the redundant line features, an effective linear matching is performed by utilizing the appearance and geometric constraints of the linear features, to obtain poses of the camera.

FIGS. 3(a) and 3(c) show diagrams of the effects of line feature extraction by utilizing LSD. In these FIGS., there are more short line features and a few long line features that are over-segmented due to reasons such as light and characteristics of the object itself in the image. FIGS. 3(b) and 3(d) show diagrams of the effects of line feature extraction by means of conditional screening. It can be seen from the figures that the redundant short line features and partial line features extracted repeatedly are eliminated from the image by utilizing the conditional screening method according to the present disclosure, such that the distribution of the extracted line features is clearer in the image, which provides a good foundation for the subsequent line feature matching.

In step II, a first image frame is determined as a first key frame, and image frames are acquired successively during the robot movement as consecutive image frames (also called as normal frames). The consecutive image frames are indexed, and new key frames are selected from them based on the key frame selection strategy, to be interpolated into the key frame library.

Now, the key frame selection strategy is described. The adopted indexing mode includes a forward indexing mode in which the indexing order is the same as the image acquisition order, and an inverted indexing mode in which the indexing order is opposite to the image acquisition order. In the forward indexing, indexing is performed forwardly from the latest key frame as a starting point, until the next key frame is picked or the last image frame in the consecutive image frames is indexed. When a new key frame is determined based on the angle threshold of forward indexing, by means of the inverted key frame indexing strategy, indexing is performed invertedly from the new key frame as a starting point, until a previous key frame is searched. In the forward indexing, a consecutive image frame is determined as a key frame based on whether the displacement variation or the forward rotation variation from the current consecutive image frame and the current key frame satisfy respective thresholds. In the inverted indexing, inverted rotation variations between the current key frame and all normal frames between the current key frame and the previous key frame is estimated, and a normal frame is determined as a missed key frame and added in the key frame library based on whether the respective inverted rotation variation is greater than an inverted angle threshold. Both the forward rotation variation and the inverted rotation variation are rotation variations. The inverted indexing and forward indexing can be performed simultaneously, i.e., a bi-directional indexing can be performed simultaneously.

The mathematical expression of the key frame selection strategy is expressed as follows:

$$kf_j = \{f_i | ([\Delta p_{ji} > \tau] \cup [\Delta \theta_{ji} > \gamma_1] \cup [\Delta \theta_{ci} > \gamma_2])\} \quad (6).$$

Where $kf_j$ denotes a key frame. When the key frame selection strategy is satisfied, a new key frame $kf_j$ is inserted and j is incremented, namely j=j+1. When the newly inserted key frame $kf_j$ satisfies $\Delta\theta_{ji} > \gamma_1$, the key frame is set as a starting point for the inverted indexing, i.e., the current key frame $kf_c$, c being a marker of the current frame. When the key frame is added during the inverted indexing, the new key frame is set as a new starting point for successive inverted indexing, without resetting the current key frame $kf_c$. $f_i$ represents a continuous image frame; in the forward indexing, $\Delta p_{ji}$ represents a displacement variation from an current i-th frame $f_i$ to the previous key frame $kf_j$ (i.e., a j-th key frame); and $\Delta\theta_{ji}$ represents a forward rotation variation from the current i-th frame $f_i$ to the previous key frame $kf_j$ (i.e., the j-th key frame). An rotation variation $\Delta\theta_{ci}$ between $kf_c$ and the ordinary frame $f_{i_c-r}$, ($i_{c-1}<i_c-r<i_c$) located between $kf_c$ and $kf_{c-1}$ when inverted indexing is performed according to the strategy, and in the case, $i=i_c-r$ and $\Delta\theta_{ci}$ denotes the inverted rotation variation between the current key frame $kf_c$ and the i-th consecutive image frame located between the current key frame $kf_c$ and the previous key frame $kf_{c-1}$ during the inverted indexing. $\tau$ denotes a displacement threshold. $\gamma_1$ denotes the a forward angle threshold, $\tau$ and $\gamma_1$ are main basis for selecting key frames in the forward indexing. $\gamma_2$ denotes an inverted angle threshold, which is the basis for selecting key frames in the inverted indexing.

Figure 6:
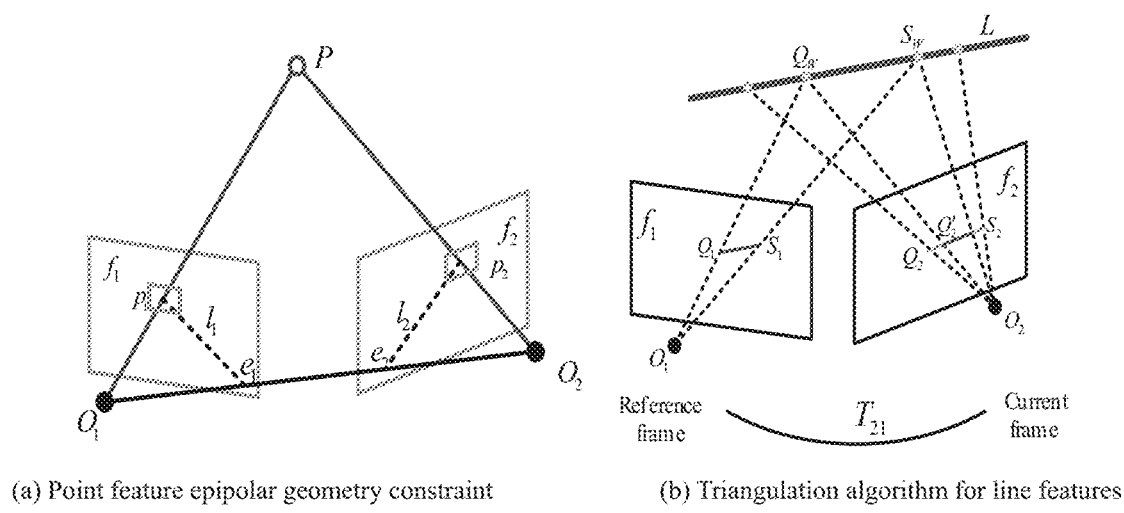
FIG. 6 shows a schematic diagram of epipolar geometry constraint for point features and the triangulation algorithm for line features in the present disclosure.

The process of indexing and selecting key frames is specified below based on the attached drawings. A robot travels in an indicated direction and acquires data about consecutive image frames. A first frame of the consecutive image frames is determined as a first key frame, and its position is set as a starting point of a world coordinate system. A pose change between frames is estimated by an Epipolar Geometry method and a matrix characterizing the pose change between frames is expressed as Equation (7) by utilizing the Epipolar Geometry method. After the point and line features in the image are extracted and matched, Epipolar Geometry Constraint of the point features and the triangulation algorithm for the line features, as shown in FIG. 6. Taking a point feature as an example, projections of a point $P=[X,Y,Z]^T$ in space in two frames are expressed as $p_1$ and $p_2$ respectively, and pixel positions of pixel points $p_1$ and $p_2$ can be obtained by utilizing a pinhole camera model, and are expressed as follows.

$$\begin{cases} s_1 p_1 = KP, \\ s_2 p_2 = K(R_{21}P + t_{21}). \end{cases} \quad (7)$$

Where $s_1$ and $s_2$ are scale factors, K represents an intrinsic matrix of the camera, and $R_{21}$ and $t_{21}$ represent the rotation and translation matrices of $I_2$ with respect to $I_1$, respectively, which can be obtained by using a fundamental matrix or an essential matrix to recover motion of the camera. After the rotation and translation matrices are derived, three-dimensional (3D) vectors are projected onto a 2D plane, and then a translation variation $\Delta p$ and a rotation variation $\Delta\theta$ between any two frames required by this algorithm can be obtained. A change of the rotation variation $\Delta\theta$ is small during rectilinear motion of the robot, and the change is mainly reflected in the translation variation $\Delta p$. Therefore, a key frame is obtained by utilizing a displacement threshold $\tau$ during the rectilinear motion of the robot, that is, the key frame is selected when $\Delta p$ exceeds the displacement threshold $\tau$, which corresponds to the forward indexing in FIG. 5.

Figure 5:
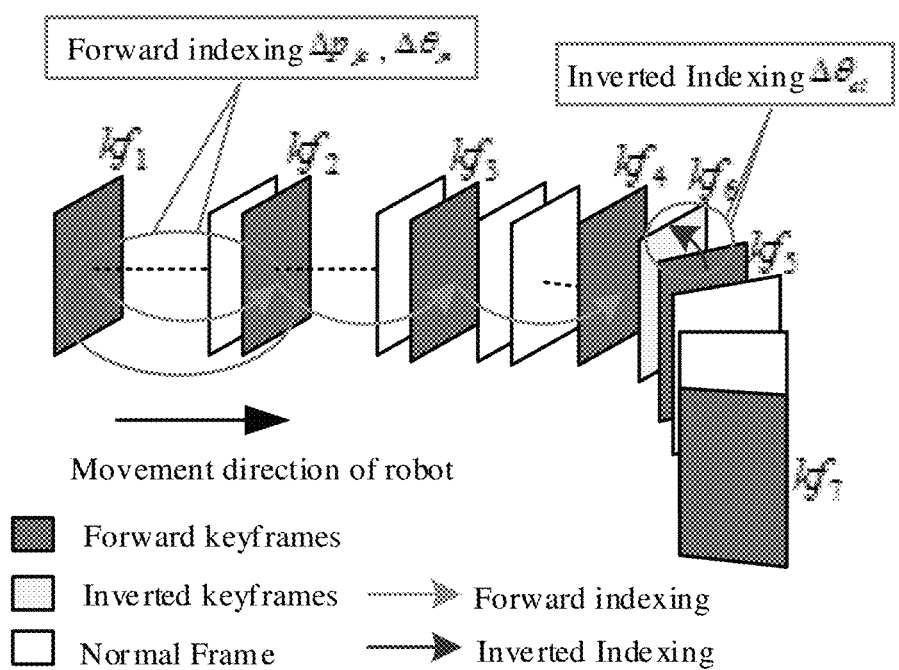
FIG. 5 shows a schematic diagram of an inverted index-based key frame selection strategy according to the present disclosure.

In a specific embodiment of the present solution, when the robot exercises a curvilinear motion, especially when the robot turns a corner, the robot can undergo large driving angle changes in a short time and short distance range. In this case, if the image frame at a key position is not set as a key frame, resulting in missing key frames at the key position, the subsequent closed-loop detection and accumulative error correction will be directly affected, and in turn a construction of the global consistent trajectory map will be affected. Therefore, when the robot exercises a curvilinear motion, it is necessary to combine a forward angular threshold and an inverted angular threshold for key frame selection. The specific process of key frame selection is as follows. $\Delta p_{jc}$ and $\Delta\theta_{jc}$ represent the displacement and angle variations of the current frame $f_c$ relative to the previous key frame $kf_j$ respectively, and the rotation variation $\Delta\theta_{jc}$ between the current frame $f_c$ and the previous key frame $kf_j$ is calculated, where c is a marker of the current frame and j represents a serial number of the key frame. When $\Delta\theta_{jc}$ is greater than the forward angle threshold $\gamma_1$, the current key frame is set as a new key frame and is denoted as the current key frame $kf_c$. Moreover, bi-directional indexing is performed from the current key frame as the starting point. The bi-directional indexing includes forward indexing and inverted indexing. In the inverted indexing, inverted rotation variations $\Delta\theta_{ci}$ between $kf_c$ and all normal frames between $kf_c$ and $kf_{c-1}$ are estimated, and when $\Delta\theta_{ci}$ is greater than the inverted angle threshold $\gamma_2$, corresponding consecutive image frame $f_i$ is selected as a key frame and inserted into the key frame library. FIG. 5 shows a schematic diagram of the inverted indexing-based key frame selection strategy. The above process does not interrupt the forward indexing for key frames, that is inter-frame pose estimation is performed at the same time and new key frames are further selected based on the translation threshold $\tau$ and the angle threshold $\gamma_1$. In practice, $\gamma_1$ and $\gamma_2$ are influenced by the sparsity of environmental textures, and are generally set to be $\gamma_1 > \gamma_2$ to avoid redundancy of key frames. The algorithm of the inverted index-based key frame selection strategy is shown below.

---

Algorithm 2 Inverted indexing-based key frame selection strategy

Input: Continuous image frame $f_i$
Output: Key frame $kf_j$
Parameters: displacement threshold $\tau$, forward angle threshold $\gamma_1$,
    inverted angle threshold $\gamma_2$
$kf_1 \leftarrow f_1$
FOR new $f_i$ available THEN
    Calculating the displacement variation $\Delta p_{ji}$, rotation variation $\Delta\theta_{ji}$
    between $f_i$ and the previous key frame $kf_j$
    IF $\Delta p_{ji} > \tau$ THEN
        Insert a new key frame, $kf_j \leftarrow f_i$, j = j + 1
    ELSEIF
        $\Delta\theta_{ji} > \gamma_1$ THEN
        Insert a new key frame, $kf_j \leftarrow f_i$, j = j + 1
        The current key frame $kf_c$ is set as the starting point for inverted
        indexing to calculate the rotation variation $\Delta\theta_{ci}$ between $kf_c$ and the
        normal frame $f_{i_c-r}$,($i_{c-1} < i_c - r < i_c$) between $kf_c$ and $kf_{c-1}$.
            IF $\Delta\theta_{ci} > \gamma_2$ THEN
            Insert a new key frame, $kf_j \leftarrow f_i$, j = j + 1
            ELSE
            RETURN NULL
            END IF
    END IF
END FOR

---

If all key frames inserted are periodically rearranged to facilitate performing closed-loop detection in step III for searching for the key frame, the key frame acquired by utilizing the inverted indexing can be set as $kf_{c-s}$, which represents a s-th new key frame obtained by utilizing the inverted indexing with the j-th key frame as a starting point before the rearrangement. The obtained key frame $kf_{c-s}$ is inserted between $kf_{c-1}$ and $kf_c$ or between $kf_{c-1}$ and the previous key frame $kf_{c-s}$. A key frame $kf_{c-s}$ obtained by combining the inverted indexing is rearranged from $f_1$. When the rearrangement is performed to the key frame $kf_{c-s}$ obtained by the inverted indexing, where the value of s is the maximum value $s_j$, and the key frame after rearrangement is denoted as $kf_j$. Further, the next key frame $kf_{c_j-s}$ subject to rearrangement is denoted as $kf_{j'}$, and $j'=j-s+s_j$, where s represents the s-th new keyframe obtained by the inverted indexing, $s_j$ represents the maximum value of s in $kf_{c_j-s}$. In the subsequent rearrangements involved m different key frames $kf_{c_j-s}$ with different j, $j=k_1, k_2, \ldots k_m$, for each key frame $kf_{c_j-s}$, a maximum value $s_{km}$ of s is incremented during rearrangement. Thus, the serial number in rearrangement can be expressed as $j'=j-s+s_{k1}+s_{k2}+ \ldots +s_{km}$, where k1, k2, ... km represent the 1st, 2nd, ... mth values of j in all key frames $kf_{c_j-s}$ before the current key frame $kf_j$ is rearranged. A new key frame sequence obtained after rearrangement is used in step 3.

In step III, closed-loop detection is performed based on the acquired image features and the accumulative errors are corrected.

The step is specifically described below. After selecting key frame, all other key frames with the same vocabulary as that of the selected key frame are searched in the map by using the bag-of-words vectors in the bag-of-words model, and a similarity score between the features of the selected key frame and the new key frame is calculated to determine whether the motion trajectory forms a closed loop. In calculating the similarity score, based on proportions of the points and lines in the closed-loop candidate frames, the point and line features are weighted.

$$S_{ij}=\omega_{ij}^P S_{ij}^P + \omega_{ij}^l S_{ij}^l \tag{8}$$

Where $\omega_{ij}^P$ and $\omega_{ij}^l$ represent weights of the point feature and line feature in the current closed-loop candidate frame respectively, which are determined by the respective numbers of correctly matched point and line features on the corresponding frame, and both changed in the same interval [0, 1]. $S_{ij}^P$ and $S_{ij}^l$ represent the similarity scores of the point and line features respectively.

Now, in combination with specific experiments, the closed-loop detecting method using inverted index-based key frame selection strategy is illustrated.

The method proposed in this patent was experimentally verified on a computer with hardware and software configuration of CPU which adopts i5 processor, main frequency of 2.9 GHz, RAM with 8G memory capacity, and Operating System which adopts Ubuntu 18.04. The datasets used are the publicly available KITTI dataset and TUM dataset.

Experiment I. Point and Line Feature Extraction Experiment

A comparison of the feature extraction results obtained by the 3 algorithms, ORB-SLAM2, PL-SLAM and IFPL-SLAM, on the TUM dataset is shown in FIG. 7. The comparison results of feature extraction time and matching accuracy for the 3 algorithms are shown in Table 1. The scenes shown in FIGS. 7(a) to 7(f) are rich in texture information and dense in point and line features. From the comparison among the feature extraction results of the six figures, it can be seen that rich feature information can be extracted in the dense scene by utilizing the above three algorithms. Further, in comparison with the PL-SLAM algorithm, the IFPL-SLAM algorithm adopts the pose tracking decision under guidance of information entropy, in which the point features, which are extracted from the image by calculating the information entropy of the point features, can already satisfy the camera pose solution. Therefore, in the present disclosure, line feature extraction is not performed on the image frame, thereby saving the time cost for processing line features. Compared with the PL-SLAM algorithm, the processing time per frame of the present disclosure is reduced by 16.0%. The scenes shown in FIGS. 7(h) to 7(i) is sparsely textured, in which the ORB-SLAM2 algorithm, which extracts only point features, has a low matching accuracy due to the lack of a sufficient number of uniformly distributed point features for feature matching. IFPL-SLAM algorithm overcomes the disadvantage of insufficient point features in sparse scenes, and in the case of insufficient point features in sparse scenes, the algorithm can timely calls the line features in the environment, which then be conditionally screened to remove redundant line features, thereby improving the accuracy of feature matching on the whole. Compared with ORB-SLAM2, the accuracy of feature matching for the method according to the present disclosure is improved by 7.8%.

TABLE 1

Comparison of feature matching accuracy and feature processing time for 3 algorithms under TUM dataset

| TUM Sequence | Feature Matching Accuracy (%) | | | Feature extraction time (ms) | | |
|---|---|---|---|---|---|---|
| | ORB-SLAM2 | PL-SLAM | IFPL-SLAM | ORB-SLAM2 | PL-SLAM | IFPL-SLAM |
| fr2/360-hemisphere | 84.5 | 87.5 | 90.8 | 38.5 | 54.2 | 45.6 |
| fr3/large/cabinet | 76.5 | 85.7 | 89.4 | 40.6 | 57.3 | 50.1 |
| fr1/plant | 85.6 | 83.6 | 88.9 | 42.3 | 57.8 | 47.2 |
| fr2/xyz | 86.7 | 88.1 | 90.1 | 40.5 | 60.1 | 49.7 |
| Average | 83.3 | 86.9 | 89.8 | 40.5 | 57.4 | 48.2 |

Experiment II. Evaluation Based on KITTI Dataset

The test results of the method proposed in present disclosure on the KITTI dataset are shown below. FIGS. 8(a) to 8(d) show the comparison results of the trajectory maps obtained by utilizing the 3 algorithms of ORB-SLAM2, PL-SLAM and IFPL-SLAM, under 4 sequences of KITTI dataset, respectively. Table 2 shows the comparison data obtained by utilizing the 3 algorithms on the 4 dataset sequences. Sequence 01 and Sequence 10 are simpler, and three algorithms achieve tracking with different accuracies, in which the trajectory of IFPL-SLAM algorithm is closer to the real trajectory. FIG. 8(c) shows the trajectory maps obtained by utilizing the three algorithms on Sequence 08, which has sparse scene texture information when the real trajectory coordinate is near a position (375, 400). In the ORB-SLAM2 algorithm, tracking loss occurs due to fewer point features extracted in the sparse scene. However, in the IFPL-SLAM and PL-SLAM algorithms, mapping of the entire environment is completed by the virtue of the complementary tracking of line features. The Sequence 02 shown in FIG. 8(d) is a closed loop-based image sequence, and all the three algorithms correct the accumulative error by closed-loop detection. As can be seen from partial enlarged views in FIGS. 8(c) and 8(d), during cornering and curvilinear motion, the positioning accuracy of algorithm is improved due to the fact that more key frames at key locations are supplemented by utilizing the inverted index-based key frame selection strategy in the IFPL-SLAM algorithm, which cause the absolute trajectory error of IFPL-SLAM to be reduced by 23.4% compared with PL-SLAM algorithm and 43.0% compared with ORB-SLAM2. Evidently, the present disclosure has a major advantage over ORB-SLAM2 and PL-SLAM algorithms in terms of positioning accuracy.

TABLE 2

Comparison of the results of the 3 algorithms on 4 sequences of the KITTI dataset

| KITTI Sequence | Number of keyframes (frames) | | | Image processing time (frame/ms) | | | RMSE of trajectory(m) | | |
|---|---|---|---|---|---|---|---|---|---|
| | ORB-SLAM2 | PL-SLAM | IFPL-SLAM | ORB-SLAM2 | PL-SLAM | IFPL-SLAM | ORB-SLAM2 | PL-SLAM | IFPL-SLAM |
| 01 | 373 | 385 | 394 | 125 | 172 | 135 | 12.73 | 9.78 | 7.96 |
| 10 | 495 | 487 | 547 | 114 | 155 | 121 | 11.35 | 8.52 | 6.08 |
| 08 | — | 1784 | 1927 | — | 164 | 124 | — | 6.85 | 4.96 |
| 02 | 2097 | 2182 | 2285 | 134 | 181 | 156 | 9.27 | 7.89 | 6.31 |
| Average | 988.33 | 1207.25 | 1288.25 | 124.33 | 168 | 134 | 11.12 | 8.26 | 6.33 |

Experiment III. Evaluation Based on TUM Dataset

Figure 9:
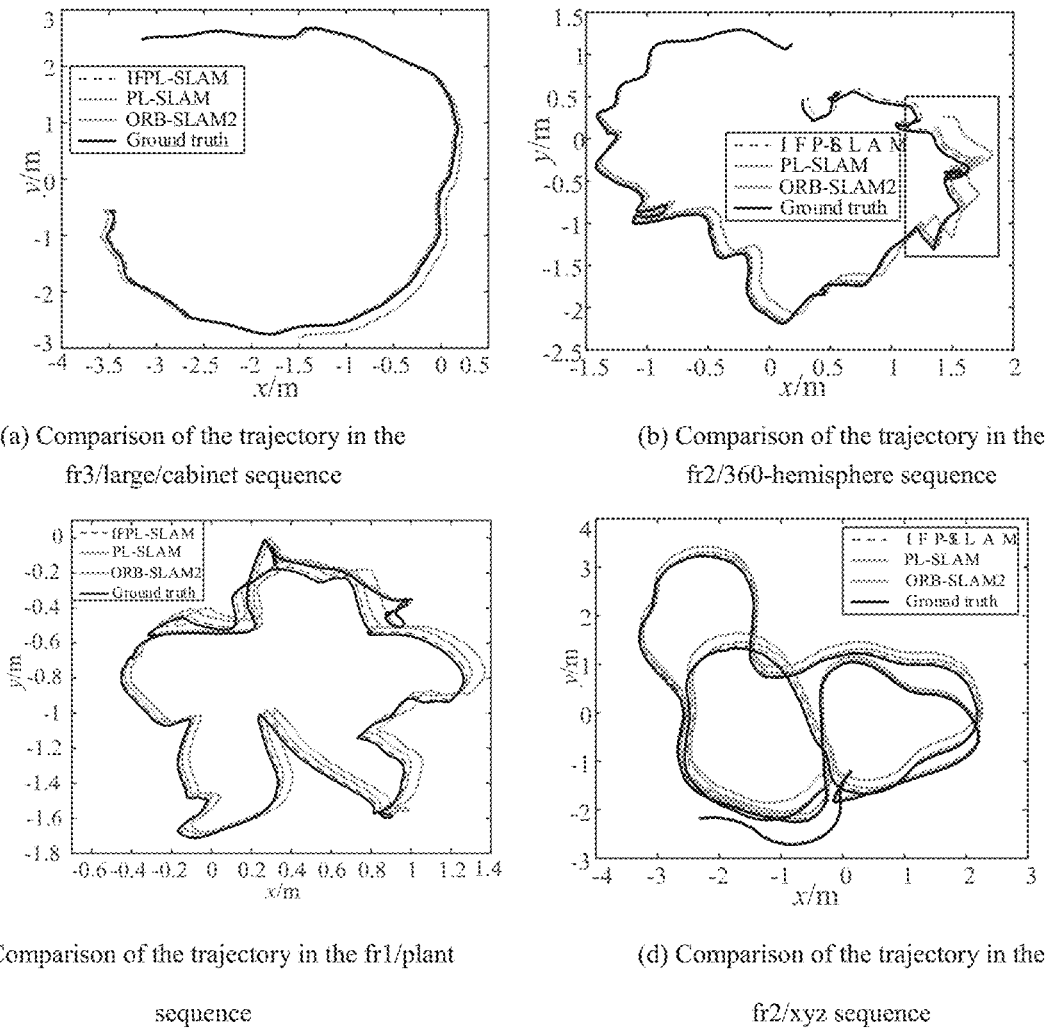
FIG. 9 shows a diagram of trajectories under TUM dataset sequences by utilizing the three algorithms in experiment III according to the present disclosure.

The algorithm is further evaluated by using the TUM dataset, which mainly originates from indoor environments. The fr3/large/cabinet sequence with sparser texture, the fr2/360-hemisphere sequence with larger rotation, and the fr1/plant and fr2/xyz sequences with closed-loop scenes are selected for the experiments to validate the algorithm according to the present disclosure. The trajectory maps constructed by utilizing the three algorithms of ORB-SLAM2, PL-SLAM and IFPL-SLAM, under different sequences are shown in FIG. 9, respectively. As shown in FIG. 9(a), the tracking effect of ORB-SLAM2 algorithm is poor due to the fact that the scene is sparse environment, and in executing the algorithm, the extracted point features cannot meet the matching requirements, resulting the tracking loss. However, the IFPL-SLAM and PL-SLAM algorithms are able to accomplish mapping in a global consistent manner, by combining point and line features for tracking. It can be seen from FIG. 9(b) that the robot makes several sharp turns in blue rectangular region, and thus ORB-SLAM2 and PL-SLAM algorithms eventually occur tracking loss near (1.344, 0), while the key frames missed in the corner are supplemented by utilizing the inverted index-based key frame selection strategy in the IFPL-SLAM algorithm, so the IFPL-SLAM algorithm can better track the bend trajectory, and improve the mapping effect of the whole environment. FIGS. 9(c) and 9(d) show a comparison of the tracking effects of the three algorithms for the closed-loop scene trajectory. All the three algorithms implement the construction of the global map for the two scenes through the closed-loop detection link. Since IFPL-SLAM algorithm conditionally screens the extracted line features and introduces the inverted index-based key frame selection strategy, the trajectory map obtained by the IFPL-SLAM algorithm according to the present disclosure is closer to the real trajectory.

Table 3 shows a comparison of translation error and rotation error of the three algorithms under different dataset sequences. From the data in the table, it can be observed that the translation error of the IFPL-SLAM algorithm is reduced by 21.3% compared to PL-SLAM and 43.1% compared to ORB-SLAM2. Moreover, the rotation error of IFPL-SLAM algorithm is reduced by 17.2% compared to PL-SLAM and 39.3% compared to ORB-SLAM2.

TABLE 3

Comparison of translation error and rotation error of the 3 algorithms under TUM dataset

| TUM Sequence | ORB-SLAM2 | | PL-SLAM | | IFPL-SLAM | |
|---|---|---|---|---|---|---|
| | Translation error (m) | Rotation error (°) | Translation error (m) | Rotation error (°) | Translation error (m) | Rotation error (°) |
| fr3/large/cabinet | — | — | 0.059 | 2.48 | 0.032 | 1.98 |
| fr2/360hemisphere | — | — | — | — | 0.043 | 2.04 |
| fr1/plant | 0.092 | 4.52 | 0.054 | 3.12 | 0.048 | 2.95 |
| fr2/xyz | 0.038 | 2.24 | 0.029 | 1.83 | 0.023 | 1.24 |
| Average | 0.065 | 3.38 | 0.047 | 2.48 | 0.037 | 2.053 |

Figure 10:
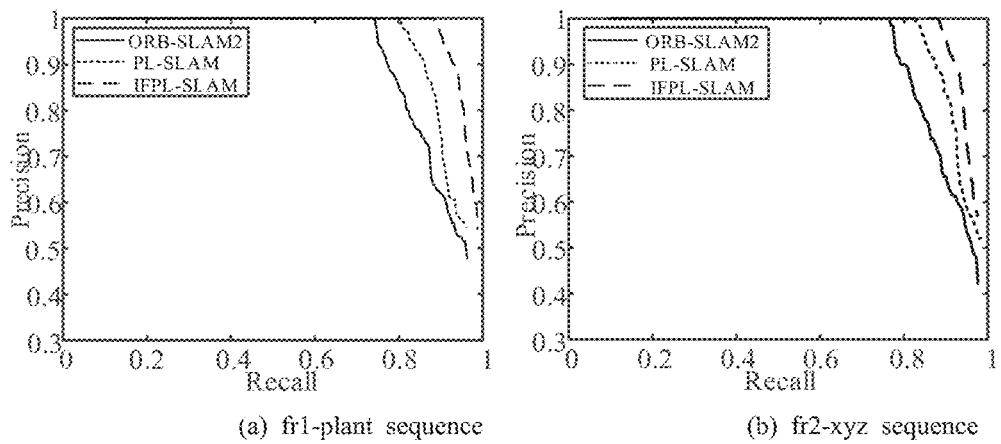
FIG. 10 shows a comparison diagram of accuracy versus recall under TUM dataset by utilizing the three algorithms in experiment III according to the present disclosure.

A comparison of the accuracy-recall curves of the three algorithms under TUM-fr1/plant and TUM-fr2/xyz sequences is shown in FIG. 10. As shown in FIG. 10, when an accuracy of IFPL-SLAM algorithm is maintained at 100%, maximums of recall for both sequences are 87.5% and 89.1% respectively, this result is improved by 12.4% compared to PL-SLAM and 19.2% compared to ORB-SLAM2.

Figure 11:
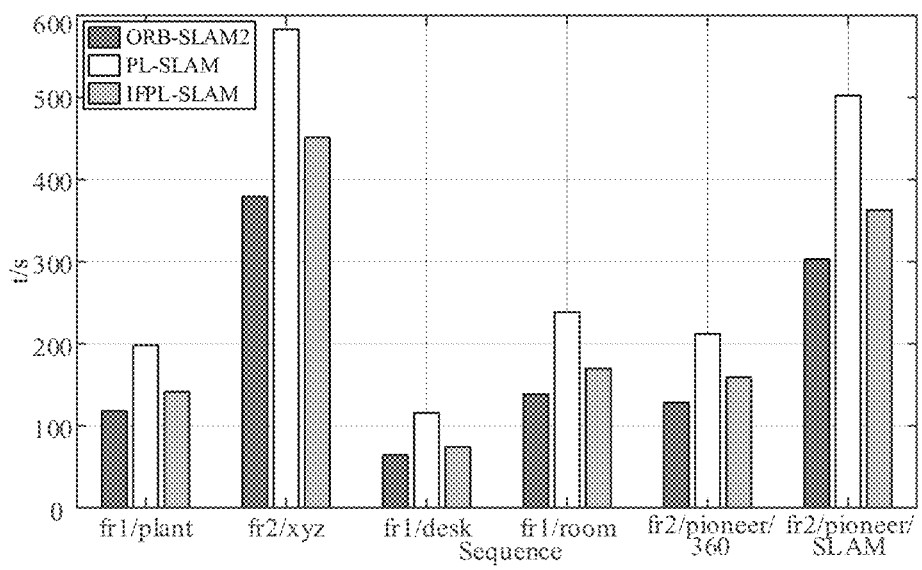
FIG. 11 shows comparison diagram of running time under the TUM dataset by utilizing the three algorithms in experiment III according to the present disclosure.

FIG. 11 shows a comparison of running time of the three algorithms under the TUM dataset. As shown in the figure, the running time of the present disclosure is reduced by 22.1% compared to PL-SLAM. Compared with the ORB-SLAM2 algorithm, the running time of the present disclosure has increased, due to the time cost expended in recognition of the texture density of the scene, extraction and screening of line features in the present disclosure. However, the present different can still meet the real-time demand.

Experiment I demonstrates that the pose tracking strategy proposed by the present disclosure can identify the scene texture densities by utilizing the information entropy of feature points and can decide how to use the fusion of point and line features. In experiments II and III, the algorithm according to the present disclosure is test on the publicly available KITTI dataset and TUM dataset, and the test results show that the present disclosure introduces the positional tracking decision under guidance of information entropy the point features extracted in the scene of dense environment texture can already implement solution of the camera pose, without calling the line features in the image, which improves the real-time performance of the algorithm and allows the running time of the present algorithm to be reduced by 16.0% compared with the PL-SLAM algorithm.

The present disclosure was verified by experiments with the improved camera pose solving method. As shown in FIG. 3, the test results show that the conventional LSD algorithm extracts more short line features and a few long line features that are over-segmented, due to the characteristics of the objects in the image itself and the light, etc. The redundant short line features and some repeatedly extracted line features in the image are eliminated by conditional screening and broken line splicing, which makes distribution of the extracted line features in the image clearer, and provides a good basis for subsequent line feature matching and improves the accuracy of feature matching.

In experiments II and III, the key frames missed at the corners are supplemented by utilizing the inverted index-based key frame selection strategy according to the present disclosure, so the present disclosure can better implement the tracking of the curve trajectory, improve the effect of mapping the whole environment, and overcome the disadvantages of large accumulative errors caused during curve motion of the robot, difficulties in accurate positioning, and incomplete closed-loop error correction, thereby improving the positioning accuracy of the algorithm and the closed-loop accuracy. The absolute trajectory error of IFPL-SLAM is reduced by 23.4% compared to the PL-SLAM algorithm and 43.0% compared to ORB-SLAM2. In closed-loop detection, under 100% accuracy, IFPL-SLAM improves by about 12.4% compared to PL-SLAM and about 19.2% compared to ORB-SLAM2, and exhibits good mapping capability.

Example II

Corresponding to Example I of the present disclosure, Example II of the present disclosure provides a computer readable storage medium having a computer program stored thereon, the program being executed by a processor to implement the following steps in accordance with the method of Example I.

In step 1, image information at a current position is acquired for being processed, and corresponding image features are extracted from the processed image information for solving a camera pose.

In step 2, image frames are captured successively during movement of a robot, as consecutive image frames. Indexing is performed on the consecutive image frames. And an inverted index-based key frame selection strategy is introduced in the key frame selection strategy to supplement the key frames that may be missed in the conventional forward indexing during the bending movement of the robot.

In step 3, closed-loop detection and correction of accumulative errors are performed based on the image features carried by key frames.

The above storage medium include: USB flash disk (UFD), mobile hard disk, Read-Only Memory (ROM), Random Access Memory (RAM), Compact Disc Read-Only Memory (CD-ROM), and various other mediums that can store program codes.

Specific limitations on the steps implemented after execution of the program in the computer readable storage medium can be found in Example I and will not be described in detail herein.

Example III

Corresponding to Example I of the present disclosure, Example III of the present disclosure provides a computer device including a memory, a processor and a computer program stored in the memory and executable on the processor. The processor executes said program to achieve the following steps in accordance with the method of Example I.

In step 1, image information at a current position is acquired for being processed, and corresponding image features are extracted from the processed image information, for solving a camera pose.

In step 2, image frames are captured successively during a movement of a robot, as consecutive image frames. An indexing is performed on the consecutive image frames. And an inverted index-based key frame selection strategy is introduced in a key frame selection strategy to supplement key frames that may be missed in conventional forward indexing during the bending movement of the robot.

In step 3, closed-loop detection and correction of accumulative errors are performed based on image features carried by key frames.

Specific limitations on the implementation steps of computer device can be found in Example I and will not be described in detail herein.

It is noted that each of the blocks in the block diagram and/or flowchart in the accompanying drawings of the specification of the present disclosure, and the combination of the blocks in the block diagram and/or flowchart, may be implemented by utilizing a dedicated hardware-based system that performs the specified function or action, or can be implemented by utilizing a combination of dedicated hardware and acquired machine instructions.

The present disclosure is exemplarily described above in connection with the accompanying figures. It is clear that the specific implementation of the present disclosure is not limited by the above-mentioned manner, and that various non-substantial improvements made with the inventive idea and technical solution of the present disclosure, or direct application of the inventive idea and technical solution to other occasions without improvement, are all within the scope of protection of the present disclosure.

What is claimed is:

1. A closed-loop detecting method using inverted index-based key frame selection strategy, comprising:
step I: acquiring image information at a current position for being processed, extracting corresponding image features from the processed image information and solving a camera pose;
wherein in step I, a pose tracking decision under guidance of information entropy is provided, and comprises: firstly extracting point features in the image, calculating an amount of information contained in the point features by information entropy $H_X$, and calling line features in the image to assist in pose estimation when the information entropy $H_X$ is below a set threshold, otherwise, performing the pose estimation by point features only;
step II: capturing image frames successively during movement of a robot, as consecutive image frames, performing, on the consecutive image frames, a indexing, in which the inverted index-based key frame selection strategy is introduced into a key frame selection strategy to supplement key frames which are prone to be missed in a conventional forward indexing during a curvilinear movement of the robot,
wherein the key frame selection strategy comprises: performing the indexing in indexing modes composed of a forward indexing with a indexing order identical with image acquisition order, and an inverted indexing, with an indexing order opposite to the image acquisition order, wherein in the forward indexing, the indexing is performed forwardly with a latest key frame as a starting point until a next key frame is searched or a last frame in the consecutive image frames is indexed; when a new key frame is determined based on an angle threshold of forward indexing, the inverted indexing start to be performed, and in the inverted indexing, the indexing is performed invertedly with the new key frame being a current key frame as a starting point until a previous key frame is searched; and in the forward indexing, a current consecutive image frame is selected as a key frame based on whether a displacement variation or a forward rotation variation between the current consecutive image frame and the current key frame reaches the corresponding threshold; and in the inverted indexing, an inverted rotation variation between the current key frame and each of normal frames located between the current key frame and the previous key frame is estimated, and when the inverted rotation variation is greater than the inverted angle threshold, corresponding normal frame is determined to be a missing key frame and added to a key frame library; and step III: performing closed-loop detection and correction of accumulative errors based on image features carried by key frames.

2. The closed-loop detecting method according to claim 1, wherein a mathematical expression of the key frame selection strategy is:

$$kf_j = \{f_i | ([\Delta p_{ji} > \tau] \cup [\Delta \theta_{ji} > \gamma_1] \cup [\Delta \theta_{ci} > \gamma_2])\},$$

wherein $kf_j$ denotes a key frame, when the key frame selection strategy is satisfied, a new key frame is inserted and j is incremented, j=j+1, and when the inserted new key frame $kf_j$ satisfies $\Delta \theta_{ji} > \gamma_1$ the new key frame $kf_j$ is set as a starting point of the inverted indexing, which also is a current key frame $kf_c$, c being a marker of a current frame, during supplementing key frame in the inverted indexing, the new key frame is set as a new starting point for subsequent inverted indexing without resetting the current key frame $kf_c$, $f_i$ denotes a i-th continuous image frame; in forward indexing, $\Delta p_{ji}$ denotes a displacement variation from a current i-th consecutive image frame $f_i$ to a previous key frame $kf_j$ which is a j-th key frame, and $\Delta \theta_{ji}$ denotes a forward rotation variation from the current i-th consecutive image frame $f_i$ to the previous key frame $kf_j$; during inverted indexing the strategy, a rotation variation $\Delta \theta_\alpha$ between $kf_c$ and the normal frame $f_{i_c-r}$, ($i_{c-1} < i_c - r < i_c$) located between and $kf_c$ and $kf_{c-1}$ is calculated, and then $i = i_c - r$; $\Delta \theta_{ci}$ denotes the inverted rotation variation between the current key frame $kf_c$ and the i-th consecutive image frame located between the current key frame $kf_c$ and the previous key frame $kf_{c-1}$ during the inverted indexing, $\tau$ denotes a displacement threshold, $\gamma_1$ denotes a forward angle threshold, $\tau$ and $\gamma_1$ are main basis for selecting key frames in the forward indexing, $\gamma_2$ denotes an inverted angle threshold, which is a basis for selecting key frames in the inverted indexing.

3. The closed-loop detecting method according to claim 2, wherein calling line features to assist in pose estimation comprises:

step 1: acquiring the image information at the current position during environment exploration of the robot in an experimental scene, calculating an image pixel gradient, obtaining a line support region in a formed pixel gradient field by using a region growth algorithm, and performing rectangular estimation on the line support region to obtain alternative line features;

step 2: updating the rectangular line support region based on a number of false alarms, outputting LSD line features meeting criteria, so as to get an initial line feature set $L_n^i$;

step 3: storing line features in the initial line feature set $L_n^i$ in descending order of length value, and performing screening and merging on them according to certain requirements to obtain a new line feature set $H_n^i$;

step 4: performing effective linear matching by using appearance and geometric constraint of the linear features after eliminating redundant line features, so as to solve the camera pose.

4. The closed-loop detecting method according to claim 3, wherein the step 3 comprises:

step 3.1: calculating a number of line features with upper line segment lengths greater than a length threshold $\lambda$ in the current image frame, and storing these line features into a set $N_\lambda$;

step 3.2: reserving first $\delta$ line features in set $H_n^i$, when a number of line features in set $N_\lambda$ is greater than $\delta$, $\delta$ being a threshold value adapted to overall sparsity of scene texture, and removing other redundant line features in set $H_n^i$ to obtain a new set $N_\lambda$;

step 3.3: splicing over-segmented long line features by splicing broken line features when the number of line features in set $N_\lambda$ is less than $\delta$, and updating $H_n^i$ and $N_\lambda$ simultaneously; stopping step 3.3 and returning to step 3.2 when the number of line features in set $N_\lambda$ is greater than or equal to $\delta$; and otherwise, reserving and outputting all line features in the initial line feature set $L_n^i$, in case that scene texture in the current image frame is sparse.

5. The closed-loop detecting method according to claim 1, wherein step III comprises:

searching, after selecting a new key frame, all other key frames with same vocabulary as that of the selected key frame in the map by using a bag-of-words vector in a bag-of-words model, and determining whether a moving trajectory forms a closed loop by calculating a similarity score between features of the selected key frames and the new key frame.

6. A non-transitory computer readable storage medium having a computer program stored thereon, the computer program when executed by a processor implements a closed-loop detecting method, wherein the method comprises:

step I: acquiring image information at a current position for being processed, extracting corresponding image features from the processed image information and solving a camera pose;

wherein in step I, a pose tracking decision under guidance of information entropy is provided, and comprises: firstly extracting point features in the image, calculating an amount of information contained in the point features by information entropy $H_X$, and calling line features in the image to assist in pose estimation when the information entropy $H_X$ is below a set threshold, otherwise, performing the pose estimation by point features only;

step II: capturing image frames successively during movement of a robot, as consecutive image frames, performing, on the consecutive image frames, an indexing, in which the inverted index-based key frame selection strategy is introduced into a key frame selection strategy to supplement key frames which are prone to be missed in a conventional forward indexing during a curvilinear movement of the robot, wherein, the key frame selection strategy comprises: performing the indexing in indexing modes composed of a forward indexing with an indexing order identical with image acquisition order, and an inverted indexing, with an indexing order opposite to the image acquisition order, wherein in the forward indexing, the indexing is performed forwardly with a latest key frame as a starting point until a next key frame is searched or a last frame in the consecutive image frames is indexed; when a new key frame is determined based on an angle threshold of forward indexing, the inverted indexing start to be performed, and in the inverted indexing, the indexing is performed invertedly with the new key frame being a current key frame as a starting point until a previous key frame is searched; and in the forward indexing, a current consecutive image frame is selected as a key frame based on whether a displacement variation or a forward rotation variation between the current consecutive image frame and the current key frame reaches the corresponding threshold; and in the inverted indexing, an inverted rotation variation between the current key frame and each of common frames located between the current key frame and the previous key frame is estimated, and when the inverted rotation variation is greater than the inverted angle threshold, corresponding normal frame is determined to be a missing key frame and added to a key frame library; and step III: performing closed-loop detection and correction of accumulative errors based on image features carried by key frames.

7. The non-transitory computer readable storage medium according to claim 6, wherein a mathematical expression of the key frame selection strategy is:

$$kf_j = \{f_i | ([\Delta p_{ji} > \tau] \cup [\Delta \theta_{ji} > \gamma_1] \cup [\Delta \theta_{ci} > \gamma_2])\},$$

where $kf_j$ denotes a key frame, when the key frame selection strategy is satisfied, a new key frame is inserted and j is incremented, j=j+1, and when the inserted new key frame $kf_j$ satisfies $\Delta\theta_{ji} > \gamma_1$ the new key frame $kf_j$ is set as a starting point of the inverted indexing, which also is a current key frame $kf_c$, c being a marker of a current frame, during supplementing key frame in the inverted indexing, the new key frame is set as a new starting point for subsequent inverted indexing without resetting the current key frame $kf_c$, $f_i$ denotes a i-th consecutive image frame; in forward indexing, $\Delta p_{ji}$ denotes a displacement variation from a current i-th consecutive image frame $f_i$ to a previous key frame $kf_j$ which is a j-th key frame, and $\Delta\theta_{ji}$ denotes a forward rotation variation from the current i-th consecutive image frame $f_i$ to the previous key frame $kf_j$; during inverted indexing the strategy, a rotation variation $\Delta\theta_\alpha$ between $kf_c$ and the normal frame $f_{i_c-r}$, ($i_{c-1} < i_c - r < i_c$) located between $kf_c$ and $kf_{c-1}$ is calculated, and then $i = i_c - r$; $\Delta\theta_{ci}$ denotes the inverted rotation variation between the current key frame $kf_c$ and the i-th consecutive image frame located between the current key frame $kf_c$ and the previous key frame $kf_{c-1}$ during the inverted indexing, $\tau$ denotes a displacement threshold, $\gamma_1$ denotes a forward angle threshold, $\tau$ and $\gamma_1$, are main basis for selecting key frames in the forward indexing, $\gamma_2$ denotes an inverted angle threshold, which is a basis for selecting key frames in the inverted indexing.

8. The non-transitory computer readable storage medium according to claim 7, wherein calling line features to assist in pose estimation comprises:

step 1: acquiring the image information at the current position during environment exploration of the robot in an experimental scene, calculating an image pixel gradient, obtaining a line support region in a formed pixel gradient field by using a region growth algorithm, and performing rectangular estimation on the line support region to obtain alternative line features;

step 2: updating the rectangular line support region based on a number of false alarms, outputting LSD line features meeting criteria, so as to get an initial line feature set $L_n^i$;

step 3: storing line features in the initial line feature set $L_n^i$ in descending order of length value, and performing screening and merging on them according to certain requirements to obtain a new line feature set $H_n^i$;

step 4: performing effective linear matching by using appearance and geometric constraint of the linear features after eliminating redundant line features, so as to solve the camera pose.

9. The non-transitory computer readable storage medium according to claim 8, wherein the step 3 comprises:

step 3.1: calculating a number of line features with upper line segment lengths greater than a length threshold $\lambda$ in the current image frame, and storing these line features into a set $N_\lambda$;

step 3.2: reserving first $\delta$ line features in set $H_n^i$, when a number of line features in set $N_\lambda$ is greater than $\delta$, $\delta$ being a threshold value adapted to overall sparsity of scene texture, and removing other redundant line features in set $H_n^i$ to obtain a new set $N_\lambda$, step 3.3: splicing over-segmented long line features by splicing broken line features when the number of line features in set $N_\lambda$ is less than $\delta$, and updating $H_n^i$ and $N_\lambda$ simultaneously; stopping step 3.3 and returning to step 3.2 when the number of line features in set $N_\lambda$ is greater than or equal to $\delta$; and otherwise, reserving and outputting all line features in the initial line feature set $L_n^i$, in case that scene texture in the current image frame is sparse.

10. The non-transitory computer readable storage medium according to claim 6, wherein step III comprises:

searching, after selecting a new key frame, all other key frames with same vocabulary as that of the selected key frame in the map by using a bag-of-words vector in a bag-of-words model, and determining whether a moving trajectory forms a closed loop by calculating a similarity score between features of the selected key frames and the new key frame.

11. A computer device comprising a memory, a processor and a computer program stored in the memory and executable on the processor, the computer program when executed by the processor implements a closed-loop detecting method, wherein the method comprises:

step I: acquiring image information at a current position for being processed, extracting corresponding image features from the processed image information and solving a camera pose;

wherein in step I, a pose tracking decision under guidance of information entropy is provided, and comprises: firstly extracting point features in the image, calculating an amount of information contained in the point features by information entropy $H_X$, and calling line features in the image to assist in pose estimation when the information entropy $H_X$ is below a set threshold, otherwise, performing the pose estimation by point features only;

step II: capturing image frames successively during movement of a robot, as consecutive image frames, performing, on the consecutive image frames, an indexing, in which the inverted index-based key frame selection strategy is introduced into a key frame selection strategy to supplement key frames which are prone to be missed in a conventional forward indexing during a curvilinear movement of the robot, wherein, the key frame selection strategy comprises: performing the indexing in indexing modes composed of a forward indexing with a indexing order identical with image acquisition order, and an inverted indexing, with an indexing order opposite to the image acquisition order, wherein in the forward indexing, the indexing is performed forwardly with a latest key frame as a starting point until a next key frame is searched or a last frame in the consecutive image frames is indexed; when a new key frame is determined based on an angle threshold of forward indexing, the inverted indexing start to be performed, and in the inverted indexing, the indexing is performed invertedly with the new key frame being a current key frame as a starting point until a previous key frame is searched; and in the forward indexing, a current consecutive image frame is selected as a key frame based on whether a displacement variation or a forward rotation variation between the current consecutive image frame and the current key frame reaches the corresponding threshold; and in the inverted indexing, an inverted rotation variation between the current key frame and each of normal frames located between the current key frame and the previous key frame is estimated, and when the inverted rotation variation is greater than the inverted angle threshold, corresponding normal frame is determined to be a missing key frame and added to a key frame library; and step III: performing closed-loop detection and correction of accumulative errors based on image features carried by key frames.

12. The computer device according to claim 11, wherein a mathematical expression of the key frame selection strategy is:

$$kf_j = \{f_i | ([\Delta p_{ji} > \tau] \cup [\Delta\theta_{ji} > \gamma_1] \cup [\Delta\theta_{ci} > \gamma_2])\},$$

wherein $kf_j$ denotes a key frame, when the key frame selection strategy is satisfied, a new key frame is inserted and j is incremented, j=j+1, and when the inserted new key frame $kf_j$ satisfies $\Delta\theta_{ji} > \gamma_1$, the new key frame $kf_j$ is set as a starting point of the inverted indexing, which also is a current key frame $kf_c$, c being a marker of a current frame, during supplementing key frame in the inverted indexing, the new key frame is set as a new starting point for subsequent inverted indexing without resetting the current key frame $kf_c$, $f_i$ denotes a i-th consecutive image frame; in forward indexing, $\Delta p_{ji}$ denotes a displacement variation from a current i-th consecutive image frame $f_i$ to a previous key frame $kf_j$ which is a j-th key frame, and $\Delta\theta_{ji}$ denotes a forward rotation variation from the current i-th consecutive image frame $f_i$ to the previous key frame $kf_j$; during inverted indexing the strategy, a rotation variation $\Delta\theta_{ci}$ between $kf_c$ and the normal frame $f_{i_c-r}$, ($i_{c-1} < i_c - r < i_c$) located between $kf_c$ and $kf_{c-1}$ is calculated, and then $i = i_c - r$; $\Delta\theta_{ci}$ denotes the inverted rotation variation between the current key frame $kf_c$ and the i-th consecutive image frame located between the current key frame $kf_c$ and the previous key frame $kf_{c-1}$ during the inverted indexing, $\tau$ denotes a displacement threshold, $\gamma_1$ denotes a forward angle threshold, $\tau$ and $\gamma_1$ are main basis for selecting key frames in the forward indexing, $\gamma_2$ denotes an inverted angle threshold, which is a basis for selecting key frames in the inverted indexing.

13. The computer device according to claim 12, wherein calling line features to assist in pose estimation comprises:

step 1: acquiring the image information at the current position during environment exploration of the robot in an experimental scene, calculating an image pixel gradient, obtaining a line support region in a formed pixel gradient field by using a region growth algorithm, and performing rectangular estimation on the line support region to obtain alternative line features;

step 2: updating the rectangular line support region based on a number of false alarms, outputting LSD line features meeting criteria, so as to get an initial line feature set $L_n^i$;

step 3: storing line features in the initial line feature set $L_n^i$ in descending order of length value, and performing screening and merging on them according to certain requirements to obtain a new line feature set $H_n^i$;

step 4: performing effective linear matching by using appearance and geometric constraint of the linear features after eliminating redundant line features, so as to solve the camera pose.

14. The computer device according to claim 13, wherein the step 3 comprises:

step 3.1: calculating a number of line features with upper line segment lengths greater than a length threshold $\lambda$ in the current image frame, and storing these line features into a set $N_\lambda$;

step 3.2: reserving first $\delta$ line features in set $H_n^i$, when a number of line features in set $N_\lambda$ is greater than $\delta$, $\delta$ being a threshold value adapted to overall sparsity of scene texture, and removing other redundant line features in set $H_n^i$ to obtain a new set $N_\lambda$;

step 3.3: splicing over-segmented long line features by splicing broken line features when the number of line features in set $N_\lambda$ is less than $\delta$, and updating $H_n^i$ and $N_\lambda$ simultaneously; stopping step 3.3 and returning to step 3.2 when the number of line features in set $N_\lambda$ is greater than or equal to $\delta$; and otherwise, reserving and outputting all line features in the initial line feature set $L_n^i$, in case that scene texture in the current image frame is sparse.

15. The computer device according to claim 11, wherein step III comprises:

searching, after selecting a new key frame, all other key frames with same vocabulary as that of the selected key frame in the map by using a bag-of-words vector in a bag-of-words model, and determining whether a moving trajectory forms a closed loop by calculating a similarity score between features of the selected key frames and the new key frame.

* * * * *